US011916683B2

United States Patent
(12) United States Patent
Hett et al.
(10) Patent No.: US 11,916,683 B2
(45) Date of Patent: Feb. 27, 2024

(54) OVERLOADING BROADCAST DWELL INTERVALS IN UNSYNCHRONIZED CHANNEL HOPPING MESH NETWORKS

(71) Applicant: Landis+Gyr Innovations, Inc., Alpharetta, GA (US)

(72) Inventors: Christopher Hett, Sandy Springs, GA (US); James Patrick Hanley, Decatur, GA (US)

(73) Assignee: Landis+Gyr Technology, Inc., Alpharetta, GA (US)

( * ) Notice: Subject to any disclaimer, the term of this patent is extended or adjusted under 35 U.S.C. 154(b) by 410 days.

(21) Appl. No.: 17/233,933

(22) Filed: Apr. 19, 2021

(65) Prior Publication Data

US 2022/0337358 A1 Oct. 20, 2022

(51) Int. Cl.
*H04L 1/1867* (2023.01)
*H04L 5/00* (2006.01)

(52) U.S. Cl.
CPC ............ *H04L 1/1896* (2013.01); *H04L 1/189* (2013.01); *H04L 1/1893* (2013.01); *H04L 5/0012* (2013.01); *H04L 5/0082* (2013.01)

(58) Field of Classification Search
None
See application file for complete search history.

(56) References Cited

U.S. PATENT DOCUMENTS

| | | | | |
|---|---|---|---|---|
| 2010/0214995 | A1* | 8/2010 | Iyer | H04W 48/12 370/329 |
| 2013/0028295 | A1 | 1/2013 | Hui et al. | |
| 2013/0279540 | A1* | 10/2013 | Hui | H04W 72/23 375/133 |
| 2015/0023363 | A1 | 1/2015 | Hui et al. | |
| 2020/0374208 | A1 | 11/2020 | Zhang et al. | |
| 2021/0306824 | A1* | 9/2021 | Li | H04W 4/40 |

OTHER PUBLICATIONS

PCT/US2022/024658, International Search Report and Written Opinion, dated Jul. 15, 2022, 13 pages.

* cited by examiner

*Primary Examiner* — Marcus Smith
(74) *Attorney, Agent, or Firm* — Kilpatrick Townsend & Stockton LLP

(57) ABSTRACT

A node includes a processor coupled to a wireless transceiver and a memory. The memory includes instructions that can cause the processor to store a broadcast channel hopping timing interval and a broadcast channel hopping sequence, as well as, channel hopping timings and channel hopping sequences for tracked neighbor nodes. The instructions can also cause the processor to determine whether a destination node for a unicast message corresponds to tracked neighbor nodes. Based on a determination that the destination node does not correspond to any tracked neighbor nodes, the processor can determine (i) a broadcast dwell interval based on the broadcast channel hopping timing interval and (ii) a next broadcast channel based on the broadcast channel hopping sequence. Additionally, instructions can cause the processor to transmit the unicast message to the destination node during the broadcast dwell interval.

22 Claims, 5 Drawing Sheets

500
502 Maintain a first channel hopping timing and a first channel hopping sequence for a scheduling module
504 Track one or more second channel hopping timings and one or more second channel hopping sequences of one or more neighbor nodes
506 Determine a need to transmit a message to a destination node
508 Destination node among neighbor nodes?
Y
510 Send message via unicast channel
N
512 Determine a broadcast dwell interval
514 Detect broadcast traffic during the broadcast dwell interval
516 Back off sending the message to the destination node during the broadcast dwell interval
518 Send the message to the destination node during the next broadcast dwell interval

OVERLOADING BROADCAST DWELL INTERVALS IN UNSYNCHRONIZED CHANNEL HOPPING MESH NETWORKS

TECHNICAL FIELD

The present invention is generally directed to communicating in an unsynchronized channel hopping network. More specifically, this invention relates to using one or more broadcast dwell intervals in an unsynchronized channel hopping mesh network to communicate a unicast message.

BACKGROUND

Some resource providers utilize channel hopping mesh networks to provide a communications platform for various networked nodes. For instance, resource providers such as utility companies, home automation providers, industrial monitoring providers, scientific application providers, etc. may monitor networked nodes via a channel hopping mesh network. In some cases, the network traffic may be optimized using an unsynchronized channel hopping mesh network.

One example of an unsynchronized channel hopping mesh network is a Wi-SUN field area network (FAN), which utilizes the IEEE 802.15.4 2015 standard. A Wi-SUN FAN network may include one or more personal area mesh networks (PANs) that utilize a Wi-SUN FAN profile or protocol. Further, Wi-SUN FAN networks may include a plurality of Wi-SUN FAN nodes, and in some cases, a plurality of layers of Wi-SUN FAN nodes.

SUMMARY

Systems and methods of the present invention provide communication techniques in an unsynchronized channel hopping network. A device located at a premises may include a node. The node may be connected to a network along with a number of other nodes and may communicate with a central system via the network. The device may be configured to use one or more broadcast dwell intervals in an unsynchronized channel hopping mesh network to communicate messages.

In one example, a node includes: a processor; a wireless transceiver communicatively coupled to the processor and configured to receive communications based on a channel hopping timing interval and a channel hopping sequence; and a memory communicatively coupled to the processor and comprising instructions that are executable by the processor to cause the processor to: store a broadcast channel hopping timing interval and a broadcast channel hopping sequence; store a channel hopping timing and a channel hopping sequence for each of a plurality of tracked neighbor nodes; determine whether a destination node for a message corresponds to any of the plurality of tracked neighbor nodes; based on a determination that the destination node does not correspond to any of the plurality of tracked neighbor nodes, determine (i) a broadcast dwell interval based on the broadcast channel hopping timing interval and (ii) a next broadcast channel based on the broadcast channel hopping sequence; and transmit a signal that causes the wireless transceiver to send the message to the destination node during the broadcast dwell interval.

One example method for transmitting messages in an unsynchronized channel hopping wireless network includes: storing, by a node, a first channel hopping timing interval and a first channel hopping sequence for the node, wherein the node comprises a wireless transceiver and a processor, and wherein the wireless transceiver of the node is configured to receive communications based on the first channel hopping timing interval and the first channel hopping sequence; storing, by the node, a broadcast channel hopping timing interval and a broadcast channel hopping sequence; storing, by the node, a channel hopping timing interval and a channel hopping sequence for each of a plurality of tracked neighbor nodes; determining, by the node, whether a destination node for a unicast message that is pending at the node corresponds to any of the plurality of tracked neighbor nodes; based on a determination that the destination node for the unicast message does not correspond to any of the tracked neighbor nodes, determining, by the node, (i) a next broadcast dwell interval based on the broadcast channel hopping timing interval and (ii) a next broadcast channel based on the broadcast channel hopping sequence; and sending, by the node, the unicast message to the destination node during the next broadcast dwell interval.

In another example, a system includes: a first node, comprising: a first processor; a first wireless transceiver communicatively coupled to the first processor and configured to receive communications based on a channel hopping timing interval and a channel hopping sequence; and a first memory communicatively coupled to the first processor and comprising instructions that are executable by the first processor to cause the first processor to: store a first broadcast channel hopping timing interval and a first broadcast channel hopping sequence; store the channel hopping timing and the channel hopping sequence for each of a plurality of neighbor nodes; determine whether a second node for a unicast message that corresponds to any of the plurality of tracked neighbor nodes; based on a determination that the second node does not correspond to any of the plurality of tracked neighbor nodes, determine (i) a broadcast dwell interval based on the first broadcast channel hopping timing interval and (ii) a next broadcast channel based on the first broadcast channel hopping sequence; and transmit a signal that causes the first wireless transceiver to send the unicast message to the second node during the broadcast dwell interval; and the second node, comprising: a second processor; a second wireless transceiver communicatively coupled to the second processor and configured to receive communications based on a second broadcast channel hopping timing interval and a second broadcast channel hopping sequence; and a second memory communicatively coupled to the second processor and comprising instructions that are executable by the second processor to cause the second processor to: store the second broadcast channel hopping timing interval and the second broadcast channel hopping sequence; determine (i) the broadcast dwell interval based on the second broadcast channel hopping timing interval and (ii) the next broadcast channel based on the second broadcast channel hopping sequence; detect the unicast message during the broadcast dwell interval; and in response to detecting the unicast message during the broadcast dwell interval, back off sending a broadcast message during the broadcast dwell interval.

These and other features, aspects, and advantages of the present disclosure are better understood when the following Detailed Description is read with reference to the accompanying drawings.

DETAILED DESCRIPTION

Aspects of this invention use broadcast dwell intervals in an unsynchronized channel hopping mesh network to communicate certain unicast messages. Additional aspects of the invention may optimize network traffic by overloading an unsynchronized channel hopping mesh network during a broadcast dwell interval. Certain aspects of the invention involve overloading the unsynchronized channel hopping mesh network by using the broadcast dwell interval to communicate both broadcast messages and certain unicast messages. For the purposes of this disclosure, overloading includes an ability to communicate messages other than broadcast messages using a broadcast channel, e.g., during a broadcast dwell interval. The following non-limiting examples are provided to introduce certain aspects of this disclosure.

In one example, an asynchronous Wi-SUN FAN network may facilitate communications between Wi-SUN FAN nodes, e.g., via channel hopping sequences of Wi-SUN FAN slot frames. These slot frames may also include a sequence of time slots (e.g., unicast intervals, unicast dwell intervals, broadcast intervals, or broadcast dwell intervals, etc.). In addition, these slot frames include asynchronous unicast dwell intervals, so each node in a Wi-SUN FAN PAN may include different channel timings, channel sequences, or both.

In such an unsynchronized channel hopping mesh network (e.g., Wi-SUN FAN), each node in a PAN maintains its own channel hopping timing and channel hopping sequence. When a node needs to transmit a unicast frame to a neighbor node, it must first track the neighbor node (e.g., a neighbor node's channel hopping timing and channel hopping sequence). But this can be problematic for nodes in a large or dense PAN or for nodes that are constrained. For instance, constrained nodes may have a limited amount of available memory for tracking neighbor nodes. In such a case, a constrained node may determine a need to transmit a message (e.g., a unicast message or unicast frame) to a particular neighbor node that is not being tracked.

Channel hopping networks that include a large PAN, a densely populated PAN, or constrained nodes may experience significant communications challenges. For example, a large PAN or a densely populated PAN may include a large number of nodes. As a result, there may be a large number of nodes with which a node may potentially communicate. The number may be greater than the amount of memory allocated for tracking neighboring nodes. This is especially true if the node is a constrained node having a more limited amount of memory.

In each of these cases, it may be advantageous for a node to transmit a message to another node using the broadcast dwell interval, e.g., to send a unicast message during the broadcast dwell interval. In one example, the node may overload a broadcast dwell interval by transmitting the unicast message to the destination node within the mesh network.

Exemplary Operating Environment

Figure 1:
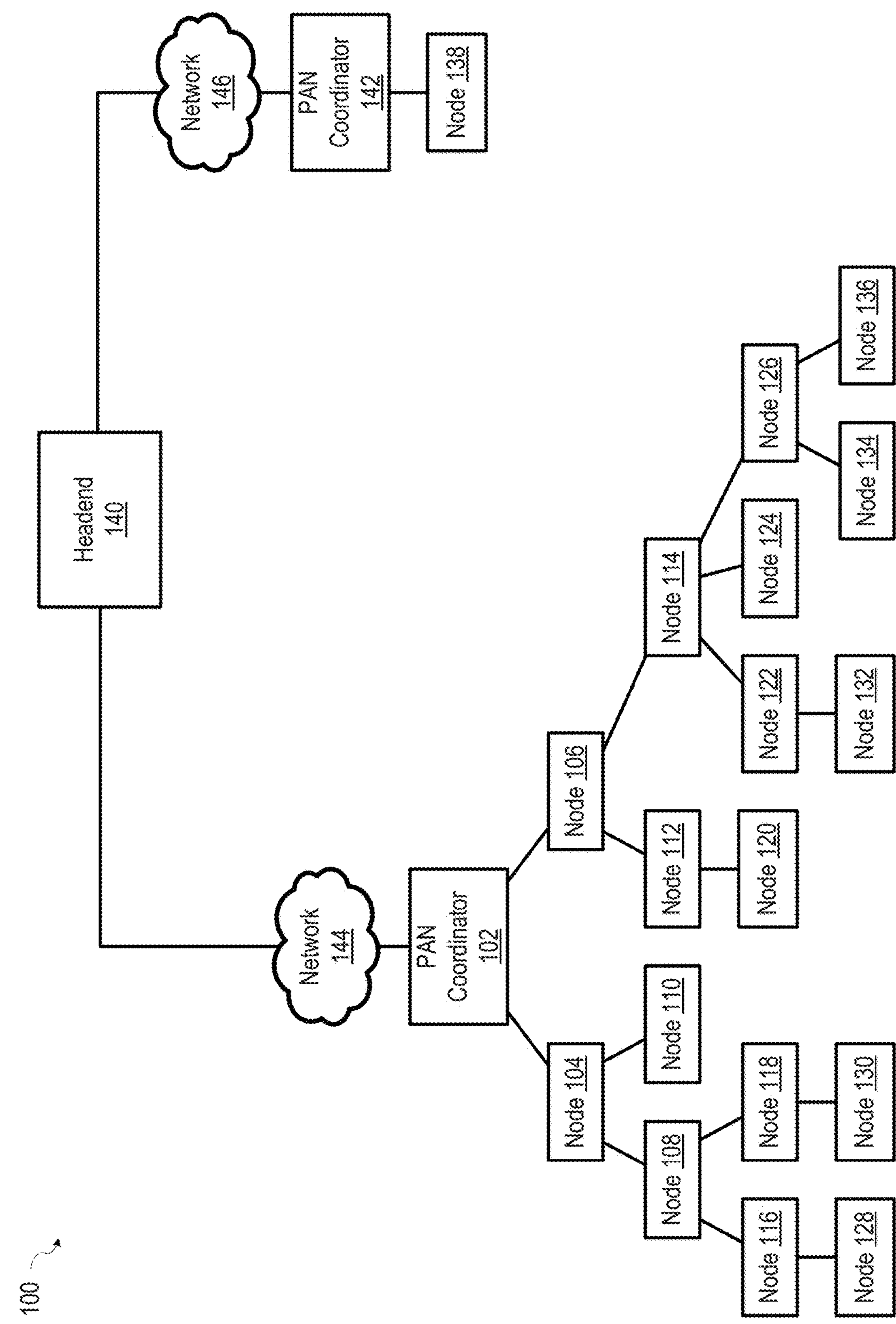
FIG. 1 illustrates an exemplary network environment for overloading broadcast dwell intervals in an unsynchronized channel hopping mesh network, according to certain aspects of this disclosure.

The present invention may operate within a node of a network, where the node includes channel hopping timings and channel hopping sequences. FIG. 1 illustrates an exemplary communication network 100 that includes an unsynchronized channel hopping mesh network. The example communication network 100 includes PAN coordinators 102, 142 and nodes 104, 106, 108, 110, 112, 114, 116, 118, 120, 122, 124, 126, 128, 130, 132, 134, 136, and 138, each of which may be in communication with a headend 140 via communication networks 144, 146.

In this example, the headend 140 communicates with the PAN coordinators 102, 142 and nodes 104-138 via the communications networks 144, 146. The communications networks 144, 146 may include a telephony network, a wireless telephony network, a wireless personal area network (WPAN), a local area network (LAN), wide area network (WAN), metro area network (MAN), another data network, or any other suitable communications network. In some examples, the headend 140 can provide centralized controls for unsynchronized channel hopping mesh networks via the communication networks 144, 146.

For example, the headend 140 may provide network information that dictates centralized controls for a PAN. For instance, the headend 140 may send network information for a PAN to a PAN coordinator (e.g., either of PAN coordinators 102, 142). The network information may include network parameters for the operations within the PAN, such as broadcast timing information, network traffic information, or bandwidth constraints. But in other examples, a PAN coordinator (e.g., either of PAN coordinators 102, 142) may provide these centralized controls for the nodes contained within its PAN (e.g., nodes 104-136, or 138, respectively).

The headend 140 may distribute network information using various types of communication signals. For example, the headend 140 may communicate network information using a radio frequency (RF) signal, a global system for mobile communications (GSM) signal, a low power radio (LPR) signal, a media-independent signal, a consumption signal, another suitable electrical signal, etc. In some examples, the headend 140 may provide monitoring services (e.g., for outages, up-time, or health statuses), geographic information, data collection (e.g., for meter data, connectivity, quality of service, etc.), scheduling information, other operational information, etc. Further, the headend 140 may be capable of sending messages or notifications to various network elements such as the PAN coordinators 102, 142, nodes 104-138, etc.

For instance, the headend 140 may provide the PAN coordinator 102 with network information that includes broadcast scheduling parameters. In response, the PAN coordinator 102 may generate and distribute a synchronized broadcast schedule based on these broadcast scheduling parameters. In some examples, the broadcast scheduling parameters may dictate a frequency or periodicity of a broadcast interval or a broadcast dwell interval. Further, the broadcast scheduling parameters may indicate or designate particular channels to be utilized for transmitting messages during the broadcast intervals or the broadcast dwell intervals.

Continuing with the example communication network 100 depicted in FIG. 1, example communication network 100 includes PAN coordinators 102, 142. In this example, PAN coordinators 102, 142 facilitate communications across their respective PANs. In some examples, each of the PAN coordinators 102, 142 may be a border router, critical node, root node, gateway router, exterior router, or any other suitable gateway device. Further, the PAN coordinators 102, 142 maintain network information for their respective PANs. For example, the PAN coordinators 102, 142 may include storage, memory, another data repository, etc. that contains network information. In some examples, the PAN coordinators 102, 142 may store network information that includes a synchronized broadcast schedule, PAN identifier (ID), network ID, network topology, network information for any number of connected devices (e.g., asynchronous unicast schedules for nodes 104-136), other network features, or any combination of these.

In this example, PAN coordinator 102 is a node that coordinates communications across a PAN that includes various neighbor nodes 104-136. Further, in this example, the PAN coordinator 102 is a border router that facilitates communications between the PAN and the headend 140 via the communications network 144. For illustrative purposes, the example communication network 100 also includes another PAN coordinator 142 that coordinates communications across a different PAN and is in communication with at least node 138. The PAN coordinator 102 is a parent node and is in communication with each of its child nodes 104, 106. And the PAN coordinator 102 is a grandparent node that is in communication with each of its grandchild nodes 108-114, great-grandchild nodes 116-126, and great-great-grandchild nodes 128-136.

In some examples, the PAN coordinator 102 may be tasked with the establishment, formation, management, or modification of its PAN. To perform these tasks, the PAN coordinator 102 may require significantly more resources (e.g., processing capabilities, persistent storage, memory, etc.) than other nodes within the PAN. Further, the storage of the various network information may also require an allocation of more resources to the PAN coordinator 102. Thus, the PAN coordinator 102 is typically not a constrained device. However, in other examples, the PAN coordinator 102 may be a constrained device. For instance, the PAN coordinator 102 may be a constrained device such as a legacy device, or the PAN coordinator 102 may be situated in a large or densely-populated PAN.

In this example, the PAN coordinator 102 includes sufficient resources (e.g., memory) to track all seventeen (17) nodes 104-136 in its PAN. For example, the PAN coordinator 102 may know the asynchronous unicast schedule information for each of the 17 total nodes within the PAN. The PAN coordinator 102 can track the unicast channel hopping timings and unicast channel hopping sequences for each of the nodes 104-136. In some examples, the PAN coordinator 102 may have network information that indicates that certain nodes within its PAN may be constrained devices. For example, the PAN coordinator 102 may receive network information from the headend 140 that indicates that one or more nodes, e.g., among the nodes 104-136, are constrained devices that have insufficient memory to track each of their neighbor nodes within the PAN. In response to receiving this network information, the PAN coordinator 102 may determine that a duration of a periodic broadcast interval or a broadcast dwell interval is insufficient.

As described above, the PAN coordinator 102 may generate and distribute a synchronized broadcast schedule based on broadcast scheduling parameters. In some examples, the PAN coordinator generates the synchronized broadcast schedule for the PAN based on broadcast scheduling parameters that are received from the headend 140. For example, the PAN coordinator 102 can create a synchronized broadcast schedule that includes designated durations for broadcast intervals and broadcast dwell intervals that correspond to broadcast channel frequencies. Further, the PAN coordinator 102 can transmit the synchronized broadcast schedule to each of the nodes within its PAN (e.g., nodes 104-136). The PAN coordinator 102 can adjust or modify the synchronized broadcast schedule if necessary.

In some cases, it may be advantageous to reconfigure communications within the PAN to optimize communications between nodes. For instance, the PAN coordinator 102 may adjust certain network parameters to optimize the transmission of unicast and broadcast messages within the PAN. Additionally, or in the alternative, the headend 140 may also be capable of adjusting or modifying certain network parameters, protocols, or a synchronized broadcast schedule for the PAN. Although this may be done infrequently, the PAN coordinator 102 may adjust certain network parameters to optimize the communications in the PAN or in response to network issues that may arise.

For example, the PAN coordinator 102 may determine a need to increase or decrease a periodicity of a broadcast interval in the synchronized broadcast schedule. In such a case, the PAN coordinator 102 may increase or decrease the periodicity based on a number of constrained nodes in the unsynchronized channel hopping mesh network. In other examples, the PAN coordinator 102 may determine a need to increase or decrease a broadcast dwell interval based on the number of constrained nodes in the unsynchronized channel hopping mesh network.

For example, the PAN coordinator 102 may determine that a broadcast dwell interval, having a shorter duration, would result in an increased number of collisions within the PAN. Responsively, the PAN coordinator 102 may maintain or increase a duration of the broadcast dwell interval. In some examples, the PAN coordinator 102 may determine a sufficiency of the broadcast dwell interval based on one or more neighbor nodes (e.g., nodes 104-136) having similar constraints. In other examples, the PAN coordinator 102 may determine the sufficiency of the broadcast dwell interval by monitoring one or more network resources within the PAN. For instance, the PAN coordinator 102 may monitor an amount of network traffic, available bandwidth, collisions, retransmissions, failure messages, etc. that occurs within the PAN over time.

In response to determining that the periodic broadcast interval or the broadcast dwell interval is insufficient, the PAN coordinator 102 may adjust the periodicity of the broadcast interval or the duration of the broadcast dwell interval. For example, if the PAN coordinator 102 determines that an undesirable number of collisions occurred in the PAN over a predetermined length of time, then the PAN coordinator 102 may increase the periodicity of the broadcast intervals or the duration of the broadcast dwell intervals. Similarly, if the PAN coordinator 102 determines that a lower threshold number of collisions did not occur in the PAN over the length of time, then the node may decrease the periodicity of the broadcast intervals or the duration of one or more broadcast dwell intervals.

Advantageously, the PAN coordinator 102 may adjust the synchronized broadcast schedule to optimize network resources. For instance, the PAN coordinator 102 may regulate an amount of network traffic present during broadcast dwell intervals. The PAN coordinator 102 may receive network information from the headend 140 that indicates bandwidth usage over time or a number of collisions over a previous time duration. If for example, the PAN coordinator 102 determines that a previous broadcast dwell interval had a suboptimal amount of available bandwidth or too many collisions, then the PAN coordinator 102 may regulate network traffic by increasing a duration of a broadcast dwell interval. And in some examples, the PAN coordinator 102 may increase a lifecycle of battery-powered nodes by decreasing the periodicity of the broadcast intervals or the length of one or more broadcast dwell intervals, thereby reducing battery drain resulting from a minimization of an amount of time nodes within the PAN need to listen during the broadcast dwell intervals.

Returning to the example communication network 100, the PAN coordinator 102 maintains channel hopping timings and channel hopping sequences for itself and each of the nodes 104-136. In this example, each of the nodes 104-136 maintains channel hopping timings and channel hopping sequences for themselves. Further, each of the nodes 104-136 maintains channel hopping timings and channel hopping sequences for each of their parent nodes and child nodes (if any).

For example, the nodes 104 and 106 maintain channel hopping timings and channel hopping sequences for their parent node, e.g., PAN coordinator 102 and each of their child nodes, e.g., nodes 108, 110 and nodes 112, 114, respectively. In this example, both of the node 104 and node 106 are constrained devices having sufficient memory to track five (5) neighbor nodes.

In this example, both of the nodes 104, 106 maintain channel hopping timings and channel hopping sequences for themselves and 5 of their neighbor nodes. As described above, the nodes 104, 106 track their parent node (e.g., PAN coordinator 102), their sibling nodes (e.g., each other), and their child nodes (e.g., nodes 108, 110 and nodes 112, 114, respectively). But in this example, each of the nodes 104, 106 only has sufficient resources to track one additional neighbor node.

Thus, the node 104 maintains its own channel hopping timings and channel hopping sequences and tracks the channel hopping timings and channel hopping sequences for the PAN coordinator 102, node 106, node 108, node 110, and a grandchild node (e.g., node 116). Due to the constraints of the node 104, it cannot maintain channel hopping timings and channel hopping sequences for the nodes 112, 114, and 118-136. Similarly, the node 106 only has sufficient resources to maintain its own channel hopping timings and channel hopping sequences and track the channel hopping timings and channel hopping sequences for the PAN coordinator 102, node 104, node 112, node 114, and one grandchild node (e.g., node 120). So, node 106 cannot maintain channel hopping timings and channel hopping sequences for nodes 108, 110, 116, 118, and 122-136.

Further, in this example, the node 104 determines a need to transmit a unicast message to a destination node that is not being tracked (e.g., node 130). The node 104 may do so by making use of the synchronized broadcast schedule provided by the PAN coordinator 102 for its unicast communication. For example, when the node 104 determines the need to transmit the unicast message to a neighbor node for which it is unable to track the channel hopping timing (e.g., node 130), the node 104 retrieves the synchronized broadcast schedule from memory. The node 104 determines a next available broadcast interval based on the synchronized broadcast schedule. Further, the node 104 can transmit the unicast message during the next available broadcast dwell interval. Advantageously, since the broadcast schedule is synchronized, the transmitting node does not need to know the channel hopping timings for the destination node.

While the example above has been described with respect to an unsynchronized network, it should be appreciated that the same principles may be applied in a synchronized network. Further, in some examples, it may be possible to increase an amount of memory to the nodes 104-136, which may facilitate tracking all available neighbor nodes. And in some cases, it may be advantageous to enforce limits to a node density that are within a predetermined range. For instance, a node density may be limited to a number of hops to match one or more constraints of one or more of the nodes 104-136.

Figure 2:
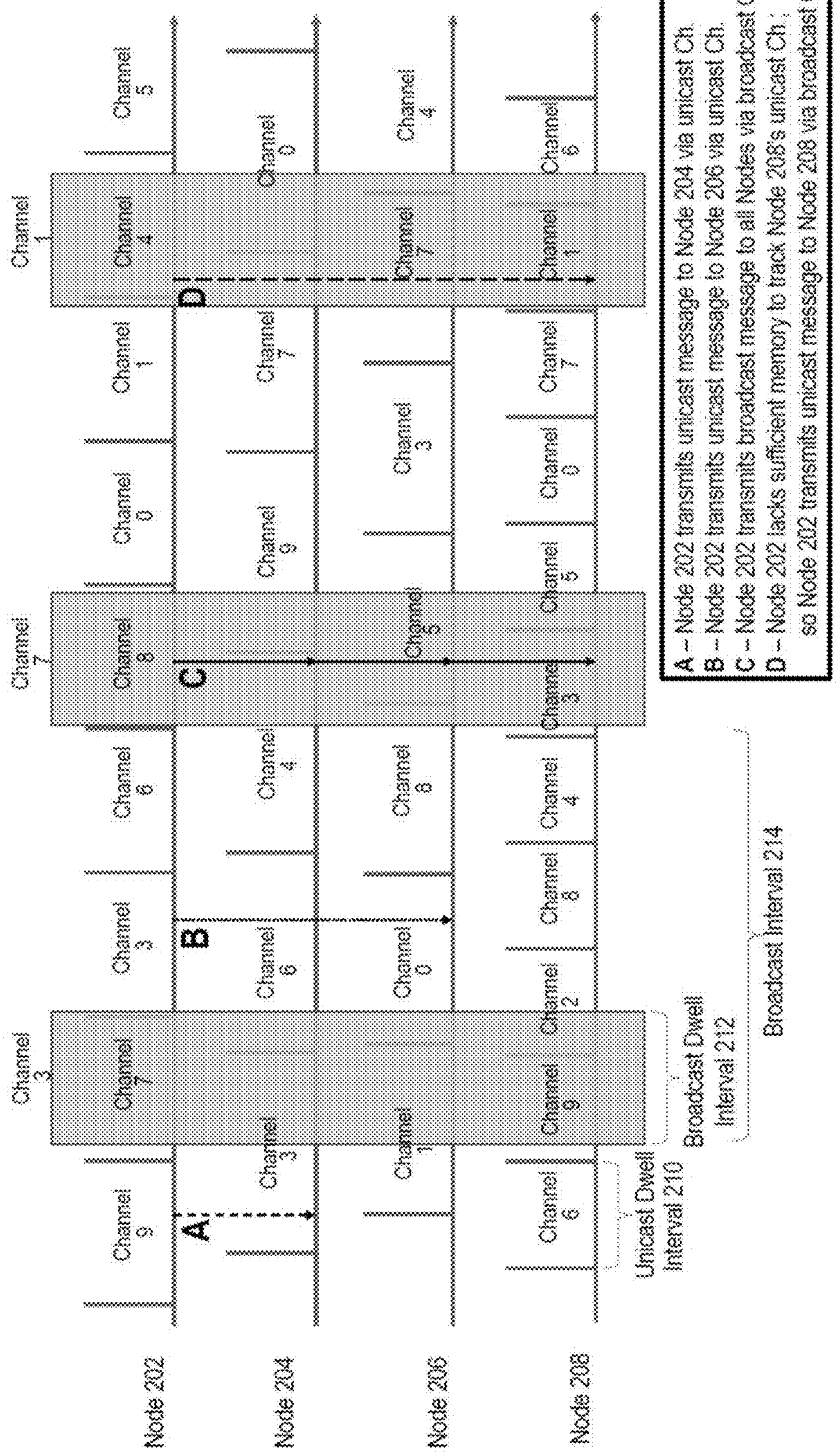
FIG. 2 illustrates exemplary network communications in a network environment for overloading broadcast dwell intervals in an unsynchronized channel hopping mesh network, according to certain aspects of this disclosure.

FIG. 2 illustrates another exemplary communication network 200 that illustrates communications between nodes. Specifically, communication network 200 includes nodes 202, 204, 206, and 208, each of which may be in communication with one another. For example, each of the nodes 202, 204, 206, and 208 may belong to a single PAN. Further, nodes 202, 204, 206, and 208 may be in communication with a headend (e.g., headend 140), a PAN coordinator (e.g., PAN coordinator 102), and/or one or more additional nodes.

FIG. 2 depicts a communication network 200 that includes a plurality of unicast channels and broadcast channels. Specifically, communication network 200 depicts a number of communications channels. For instance, the communication network 200 includes channels 0-9. It should be appreciated that the communication network 200 may include any suitable number of unicast channels and broadcast channels.

The communication network 200 shows a synchronized broadcast schedule for unicast communications for each of the nodes 202, 204, 206, and 208. For instance, each of the nodes 202, 204, 206, and 208 stores a synchronous broadcast channel hopping sequence. Specifically, nodes 202, 204, 206, and 208 stores the synchronous broadcast channel hopping sequence that includes a first broadcast dwell interval 212 during a first broadcast interval 214.

In this example, the broadcast dwell interval 212 corresponds to channel 3. Further, a second broadcast dwell interval begins when the broadcast interval 214 ends, which corresponds to channel 7. Similarly, when the second broadcast interval ends, a third broadcast dwell interval corresponding to channel 1 begins. In addition to the synchronous broadcast channel hopping sequence, each node is responsible for storing its own channel hopping timing intervals for unicast communications and information for tracked nodes.

For example, the node 202 includes channel hopping timing intervals for unicast communications that begins with unicast channel 9 and subsequently changes to channel 7, channel 3, channel 6, channel 8, channel 0, channel 1, channel 4, and channel 5 in a hopping sequence. Node 204 includes channel hopping timing intervals for unicast communications that includes intervals corresponding channel 3, channel 6, channel 4, channel 9, channel 7, and channel 0 in a hopping sequence. Likewise, the channel hopping timing intervals for unicast communications for node 206 includes channels 1, 0, 8, 5, 3, 7, and 4. And in this example, a first unicast dwell interval 210 is depicted for node 208, which corresponds to channel 6. When the unicast dwell interval 210 ends, the node 208 listens to channels 9, 2, 8, 4, 3, 5, 0, 7, 1, and 6, in the hopping sequence.

The communication network 200 shown in FIG. 2 depicts an asynchronous mesh network, which is exemplified by the asynchronous start time for each of the first unicast dwell intervals corresponding to the nodes 202, 204, 206, and 208. Further, the unicast dwell intervals depicted in the communication network 200 illustrates substantially different durations and unicast channel hopping sequences corresponding to the nodes 202, 204, 206, and 208. It should be appreciated that the communication network 200 may include one or more unicast channel hopping sequences and may include any number, order, or synchronicity of channel hopping sequences.

In this example, the node 202 is in communication with neighbor nodes 204, 206, and 208. As described above, the node 202 maintains the synchronous broadcast channel hopping sequence and its own unicast communication channel hopping sequence. In this example, the node 202 also tracks information associated with neighbor nodes. More specifically, the node 202 tracks a channel hopping timing (e.g., a duration of time corresponding to a particular unicast dwell interval) and a channel hopping sequence (e.g., a sequence of unicast communication channels corresponding a current unicast dwell interval) for neighbor nodes 204 and 206. And in this example, the node 202 is not tracking the unicast channel hopping timings and channel hopping sequences for the neighbor node 208. It should be appreciated that the nodes 202, 204, 206, and 208 may be any type of neighbor nodes. For instance, the nodes 202, 204, 206, and 208 may have a number of relationships, e.g., including parent, child, sibling, grandchild, nearest neighbor, another relationship, etc.

In some examples, the node 202 may be constrained by a limited amount of resources (e.g., processing capabilities or an available amount of memory). FIG. 2 depicts an ability of the node 202 to send various types of messages to the nodes 204, 206, and 208. In some examples, the node 202 may send messages using a medium access control ("MAC") protocol. The MAC protocol is defined by IEEE 802 as being a part of a second layer in the open systems interconnection (OSI) stack.

In this example, the node 202 can send messages using a MAC address associated with a destination node (e.g., one of the neighbor nodes 204, 206, and 208). In some examples, the node 202 may determine whether a neighbor node is idle or not. Further, the node 202 may detect the state of a particular channel using a clear channel assessment (CCA). For instance, the node 202 may use the CCA to determine a state of the current channel that corresponds to an asynchronous unicast schedule of a neighbor node, whether a collision occurred, or a completion of a transmission (e.g., based on an acknowledgement (ACK), negative acknowledgement (NACK), or a lack of the ACK or NACK), etc.

For example, the node 202 may determine a need a transmit a unicast message to the node 204. As described above, the node 202 is tracking the unicast channel hopping timing and channel hopping sequences for node 204. And in this example, the node 202 determines the need to transmit the unicast message "A" to the node 204. The node 202 determines that a unicast dwell interval for the current channel hopping timing and channel hopping sequence for tracked node 204 corresponds to channel 3.

In some examples, the node 202 may determine whether the message "A" can be sent during the remaining time in the unicast dwell interval. Additionally, or in the alternative, the node 202 may determine whether the message "A" can be sent based on an amount of network traffic associated with the unicast dwell interval. For example, the node 202 may determine traffic for the unicast dwell interval using the CCA described above. In other examples, the node 202 may receive periodic network traffic information from a PAN coordinator (e.g., PAN coordinator 102). In some examples, the node 202 may back off of the transmission of the message "A" during the unicast dwell interval, e.g., based on a size of the message "A," an amount of time remaining in the unicast dwell interval, or an amount of network traffic associated with the unicast dwell interval. In this example, the node 202 transmits the unicast message "A" to the node 204 during the unicast dwell interval.

Continuing with this example, the node 202 may subsequently determine a need a transmit a unicast message "B" to the node 206. As described above, the node 202 is tracking the neighbor node 206. In this example, the node 202 determines the need to transmit the unicast message "B" to the node 206 during a tracked unicast dwell interval for node 206 corresponds to channel 0. The node 202 transmits the unicast message "B" to the node 206 during the unicast dwell interval.

Further, the node 202 determines a need a transmit a broadcast message "C" to the node 208. To do so, the node 202 determines a next broadcast interval. For example, the node 202 uses the synchronous broadcast channel hopping sequence to determine the next broadcast interval. Further, the node 202 uses the synchronous broadcast channel hopping sequence to determine a broadcast dwell interval during the next broadcast interval. In this example, the node 202 determines the next broadcast interval corresponds to channel 7.

Similar to the unicast transmission of message A described above, the node 202 may determine whether the message "C" can be sent during the remaining time in the broadcast dwell interval. Further, the node 202 may determine whether the message "C" can be sent based on an amount of network traffic associated with the broadcast dwell interval. In some examples, the node 202 may back off of the transmission of the message "C" during the broadcast dwell interval, e.g., based on a size of the message "C," an amount of time remaining in the broadcast dwell interval, or an amount of network traffic associated with the broadcast dwell interval. The node 202 transmits the broadcast message "C" during the broadcast dwell interval.

Continuing with this example, the node 202 may also determine a need to transmit a unicast message "D" to the node 208. As described above, the node 202 is not tracking the neighbor node 208, and thus, the node 202 is unaware of the unicast channel hopping timing and channel hopping sequences for node 208. In some examples, the node 202 may not be tracking the node 208 because of an insufficient amount of memory.

In this example, the node 202 determines the need to transmit the unicast message "D" to the node 208. Further, the node 202 may determine a lack of unicast channel hopping timing information and a lack of channel hopping sequence information for the node 208. Based on such a determination, the node 202 may determine a next broadcast interval to send the unicast message. During the next broadcast interval, the node 202 transmits the unicast message "D" to the node 208 via the broadcast dwell interval corresponding to channel 1.

As described above, the node 202 may back off of the transmission of the message "D" during the broadcast dwell interval, e.g., based on a size of the message "D," an amount of time remaining in the broadcast dwell interval, or an amount of network traffic associated with the broadcast dwell interval. Further, the node 202 may back off of the transmission of the message "D" during the broadcast dwell interval based on a previous determination to back off of the transmission of another message (e.g., message "C").

In some examples, the node 202 may send a message at substantially the same time as another neighbor node that sends a message. For instance, the node 202 may send a broadcast message during a broadcast dwell interval. Simultaneously, an untracked neighbor node may send a unicast message to the node 202 (not shown). In this example, the node 202 and the untracked neighbor node 208 may send their respective messages on the same broadcast channel (e.g., channel 3) during the same broadcast dwell interval (e.g., broadcast dwell interval 212).

In this example, the broadcast message sent by the node 202 collides with the unicast message sent by the untracked neighbor node 208. In some examples, such a collision may cause a failure to deliver the broadcast message, unicast message, or both. Further, after a duration of time (e.g., a predetermined duration), the untracked neighbor node 208 may determine that the node 202 failed to receive the unicast message.

For example, the untracked neighbor node 208 may determine, after the duration of time, that the lack of an ACK message indicates that the unicast message was not delivered to the node 202. Additionally, or alternatively, the untracked neighbor node 208 may determine that a reception of a NACK message indicates that the unicast message was not delivered. In response, the untracked neighbor node 208 may retry sending the unicast message. For example, the untracked neighbor node 208 may resend the unicast message during a next broadcast dwell interval or a later broadcast dwell interval. Likewise, the node 202 may also resend the broadcast message during the next broadcast dwell interval or a later broadcast dwell interval.

In some examples, the node 202 may request network information for a particular node when a need to transmit a message to an untracked neighbor node arises. For example, the node 202 may determine a need a transmit a unicast message to the untracked neighbor node 208. In response, the node 202 may transmit a message to a PAN coordinator (e.g., PAN coordinator 102) that includes a request for the asynchronous unicast schedule for the untracked neighbor node 208.

Further, the node 202 may receive a channel hopping timing and a channel hopping sequence for the untracked neighbor node 208 from the PAN coordinator. The node 202 can then use the channel hopping timing and the channel hopping sequence for the untracked neighbor node 208 to send the unicast message during a unicast dwell interval. In some examples, constraints, such as a limited amount of memory, may require the node 202 to overwrite some existing network information to store the newly received asynchronous unicast schedule for the untracked neighbor node 208.

Exemplary Node

Figure 3:
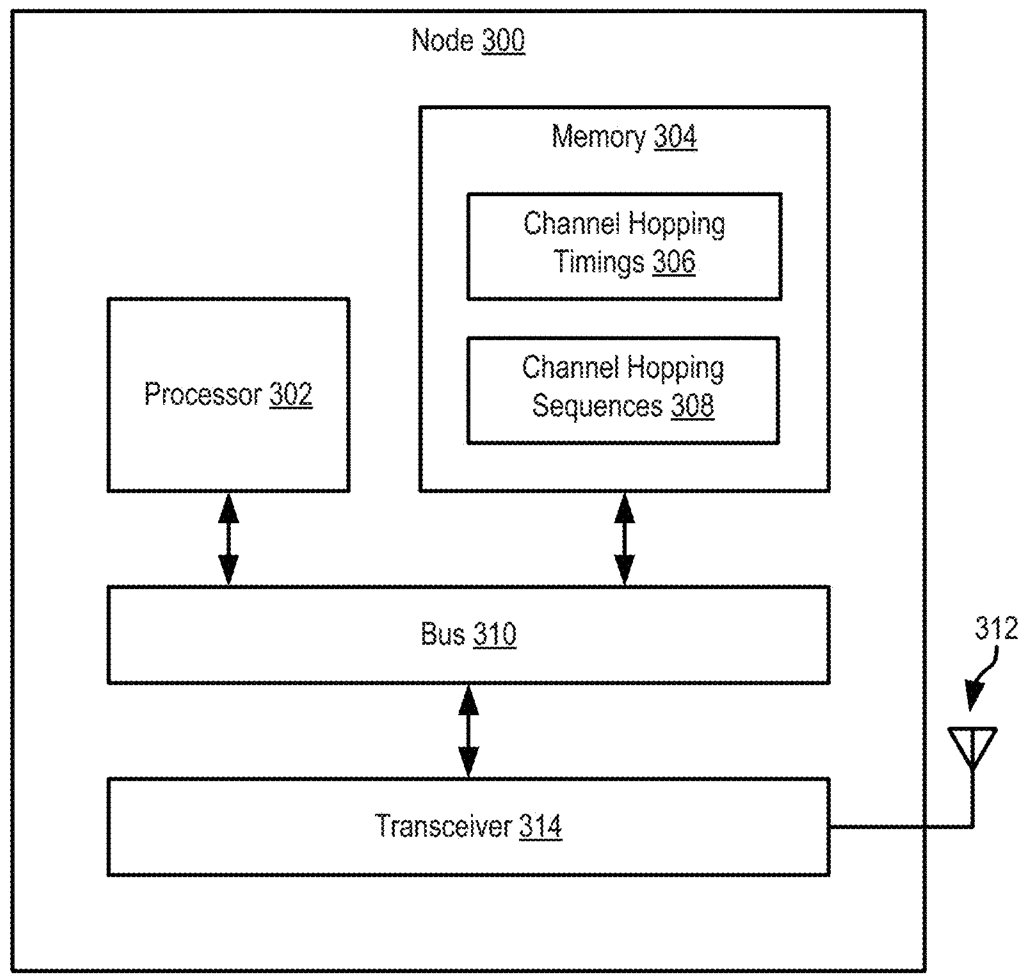
FIG. 3 illustrates an exemplary node, according to certain aspects of this disclosure.

FIG. 3 illustrates an exemplary node 300. The node 300 includes a processor 302, a memory 304, and a transceiver 314 each communicatively coupled via a bus 310. The components of the node 300 can be powered by an A/C power supply or a low energy source, such as a battery (not shown). The transceiver 314 may include, be communicatively coupled to, or be physically connected to antenna 312, and the transceiver 314 may be used to send and receive communications on the network (e.g., communications with other nodes, such as unicast messages or broadcast messages).

The processor 302 may include a microprocessor, an application-specific integrated circuit (ASIC), a state machine, a field programmable gate array (FPGA), or another suitable computing device. The processor 302 can include any number of computing devices and can be communicatively coupled to a computer-readable medium, such as memory 304. The processor can execute computer-executable program instructions or access information stored in memory to perform operation, such as those described herein.

The instructions may include processor-specific instructions generated by a compiler and/or an interpreter from code written in any suitable computer-programming language. When instructions are executed, they may configure the node 300 to perform any of the operations described herein.

The memory 304 stores information for the specific meter or scheduling information in the node 300, such as channel hopping timings 306 and channel hopping sequences 308. Other information and settings may also be stored in the memory. The memory may be a computer-readable medium and in addition to storing information and settings may store computer executable instructions which when executed may configure the communication module to perform the operations described herein.

Other components, connections between components, and arrangements of components other than those shown in FIG. 3 are possible. Although the processor 302, memory 304, bus 310, and transceiver device 314 are depicted in FIG. 3 as separate components in communication with one another, other implementations are possible. For example, the memory and processing device may be included in a single component, such as a microcontroller. The systems and components discussed herein are not limited to any particular hardware architecture or configuration.

In some examples, node 300 may include a meter. For example, a meter may measure the consumption of a resource, such as gas, electricity, or water at a premises. The meter may be included in the node 300 on a network where the node 300 communicates consumption information to a central system or head end system.

In some examples the node 300 may include additional components, such as metrology components. For example, metrology components may include a measuring device, meter, calibration device, metrology application, metrology software component, metrology script, etc. Further, a central system may analyze the consumption information to manage the resource at the premises and to manage other aspects of the system.

Exemplary Methods of Operation

Figure 4:
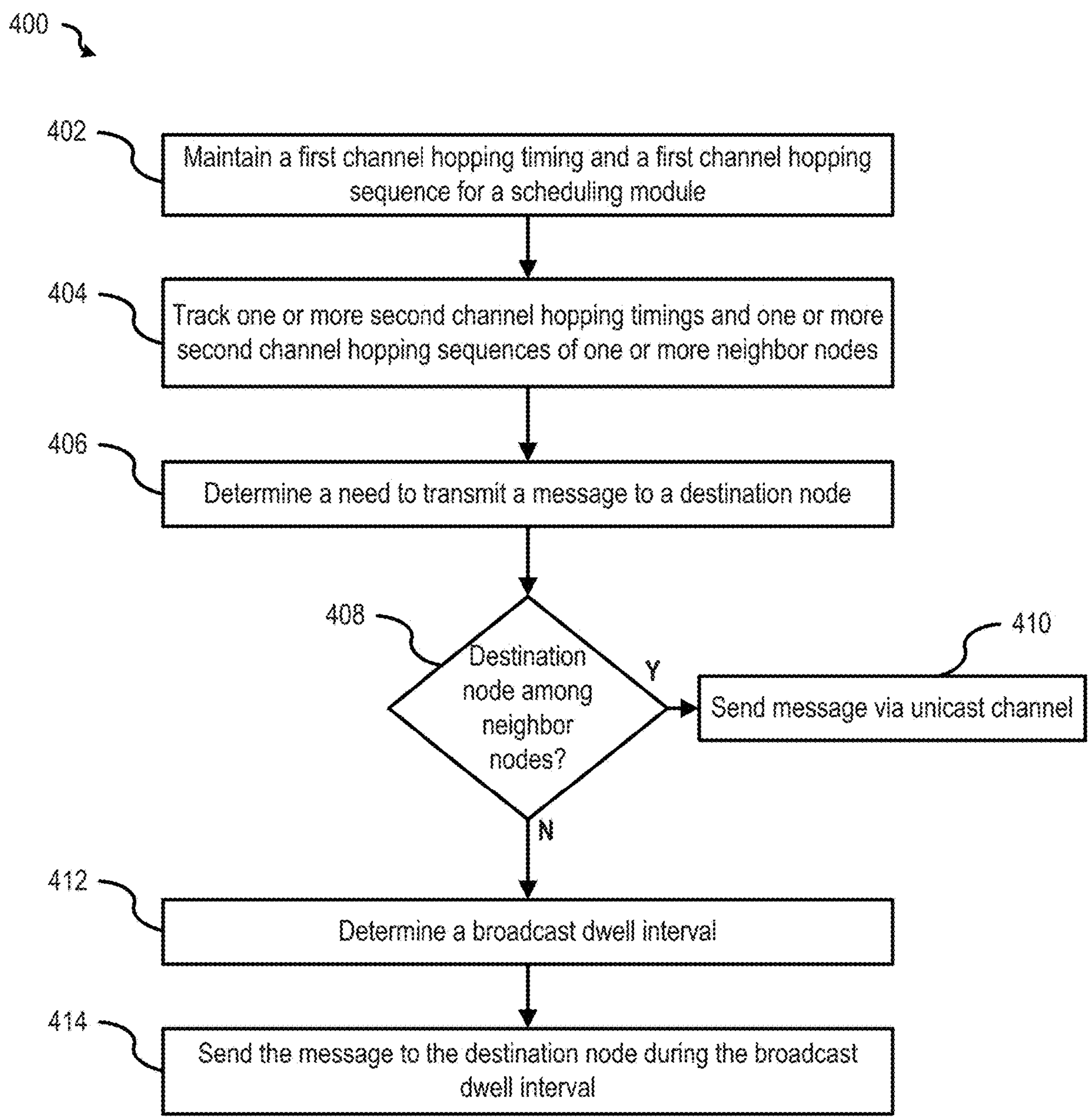
FIG. 4 illustrates an exemplary method of overloading broadcast dwell intervals in an unsynchronized channel hopping mesh network, according to certain aspects of this disclosure.

FIG. 4 illustrates an exemplary method 400 performed by a node. FIG. 4 represents an example of overloading broadcast dwell intervals in an unsynchronized channel hopping mesh network. One or more operations described with respect to FIG. 4 involve communicating in an unsynchronized channel hopping mesh network (e.g., communication network 200). The communication network 200 facilitates communications between nodes (e.g., nodes 202, 204, 206, 208, 300, etc.) according to aspects described herein. A communication device (e.g., node 300) implement operations depicted in FIG. 4 by executing suitable program code (e.g., software components related to channel hopping timings 306, channel hopping sequences 308). For illustrative purposes, the method 400 is described with reference to certain examples depicted in the figures. Other implementations, however, are possible.

The method starts at block 402, where a node (e.g., node 202) maintains a first channel hopping timing and a first channel hopping sequence. As described above with respect to FIG. 2, the node 202 can maintain a first channel hopping timing and a first channel hopping sequence that includes its own unicast communication channel hopping timing and its own unicast communication channel hopping sequence.

In some examples, the node 202 maintains a synchronized broadcast schedule and one or more asynchronous unicast schedules. These synchronized broadcast and asynchronous unicast schedules may include one or more first channel timing intervals for one or more first channel hopping sequences. Each of these first channel hopping sequences may provide network channels that the node 202 listens to, for example, in a particular order. Further, the synchronized broadcast and asynchronous unicast schedules may include a listing or other arrangement of the network channels.

In some examples, the first channel hopping timing may include timing for a synchronous broadcast channel hopping timing, its own unicast communication channel hopping timing, or both. Further, the first channel hopping timing may correspond to a first channel hopping timing interval, such as a synchronous broadcast channel hopping timing interval (e.g., duration), its own unicast communication channel hopping timing interval, or both.

The first channel hopping sequence may include a sequence for a synchronous broadcast channel hopping sequence, its own unicast communication channel hopping sequence, or both. In some examples, the synchronized broadcast and asynchronous unicast schedules may include the first channel hopping sequence, which may correspond to the first channel hopping timing intervals described above.

In block 404, the node tracks one or more second channel hopping timings and one or more second channel hopping sequences of one or more neighbor nodes (e.g., one or more tracked neighbor nodes). For example, as described above with respect to FIG. 2, the node 202 can track one or more second channel hopping timings and one or more second channel hopping sequences of one or more neighbor nodes (e.g., nodes 204, 206). In this example, the node 202 tracks the one or more neighbor nodes, which may include node 204, node 206, or both. In some examples, the one or more second channel hopping timings and the one or more second channel hopping sequences of the neighbor nodes may include one or more unicast communication channel hopping timings and one or more unicast communication channel hopping sequences, respectively.

The method proceeds from block 404 to block 406, where the node determines a need to transmit a message to a destination node. For instance, the node may determine a need to transmit a unicast message or a unicast frame to the destination node.

In block 408, the communication module determines whether the destination node is a node among the one or more neighbor nodes. If the destination node is a node among the one or more tracked neighbor nodes, then the method proceeds via the Yes branch to block 410. If the destination node is not among the one or more tracked neighbor nodes, then the method proceeds to block 412 via the No branch.

In block 410, the communication module sends the message to the destination node via a unicast channel. For example, in response to a determination that the node 202 is tracking the destination node (e.g., either of tracked neighbor nodes 204, 206), then the node 202 proceeds to send the message to the destination node via the unicast channel. For example, the node 202 may send a unicast message to the destination node 204 via the unicast channel, as illustrated by messages "A" and "B" in FIG. 2.

In some examples, the node 202 may send the unicast message to the destination node 204 based on the asynchronous unicast schedule for the destination node 204. For instance, the asynchronous unicast schedule for the destination node 204 may include a channel hopping timing and a channel hopping sequence associated with the destination node 204. The node 202 can send the unicast message to the destination node 204, e.g., by retrieving the asynchronous unicast schedule from memory (e.g., memory 304).

The node 202 may determine the channel hopping timing and the channel hopping sequence for the destination node 204 based on the retrieved asynchronous unicast schedule. Further, the node 202 may determine a current unicast channel for the destination node 204. In some examples, the node 202 may determine that a size of the unicast message is too large to transmit during a remaining unicast dwell interval (e.g., a remaining duration of time that destination node 204 is scheduled to listen to the current unicast channel).

In other examples, the node 202 may determine a next unicast channel for the destination node 204 based on its channel hopping timing and channel hopping sequence. For example, the node 202 may determine a next unicast channel for the destination node based on an amount of network traffic, available bandwidth, network resources, a remaining unicast dwell interval, an error message, an incoming notification, etc.

Alternatively, at block 412 the communication module determines a broadcast dwell interval. For example, the node 202 may determine that the broadcast dwell interval is open. In response to the determination that the node 202 is not tracking the destination node (e.g., neighbor node 208), then the node 202 proceeds to send the message to the destination node 208 via the broadcast channel. For example, the node 202 may send a unicast message to the destination node 208 via the broadcast channel.

In some examples, the node 202 may send the unicast message to the destination node 208 based on the synchronized broadcast schedule. As described above, the node 202 maintains the synchronized broadcast schedule for the PAN. The node 202 can send the unicast message to the destination node 208, e.g., by retrieving the synchronized broadcast schedule from memory (e.g., memory 304).

The node 202 may determine the channel hopping timing and the channel hopping sequence for the synchronized broadcast schedule. For example, the node 202 can determine a broadcast dwell interval (e.g., broadcast dwell interval 212) during a broadcast interval (e.g., broadcast interval 214). Further, the node 202 may determine a current broadcast channel (e.g., broadcast channel 3) associated with the broadcast dwell interval 212.

In some examples, the node 202 may determine that a size of the unicast message is too large to transmit during a remaining broadcasts dwell interval (e.g., a remaining duration of time that nodes 202, 204, 206, and 208 are scheduled to listen to the current broadcast channel). In other examples, the node 202 may determine a next broadcast channel for the next broadcast dwell interval, e.g., based on the synchronized broadcast schedule.

Further, the node 202 may determine a next broadcast channel and/or a next broadcast dwell interval based on an amount of network traffic, available bandwidth, network resources, a remaining unicast dwell interval, an error message, an incoming notification, etc. In some examples, the node 202 may determine that there is some risk of potential interference with a transmission of the message, e.g., based on some amount of packet loss, a report of a collision, a failure message (e.g., a NACK message), another indication associated with a delivery of the message (e.g., an ACK message), etc.

When a current channel hopping timing interval corresponds to the broadcast dwell interval, then the method proceeds to block 414 and sends the message to the destination node during the broadcast dwell interval. For example, the node 202 can send the message (e.g., a unicast message) via the broadcast channel associated with the broadcast dwell interval (e.g., the current broadcast dwell interval).

In one example, the node 202 sends the unicast message to the destination node 208, which is not among the tracked neighbor nodes, during the broadcast dwell interval.

Figure 5:
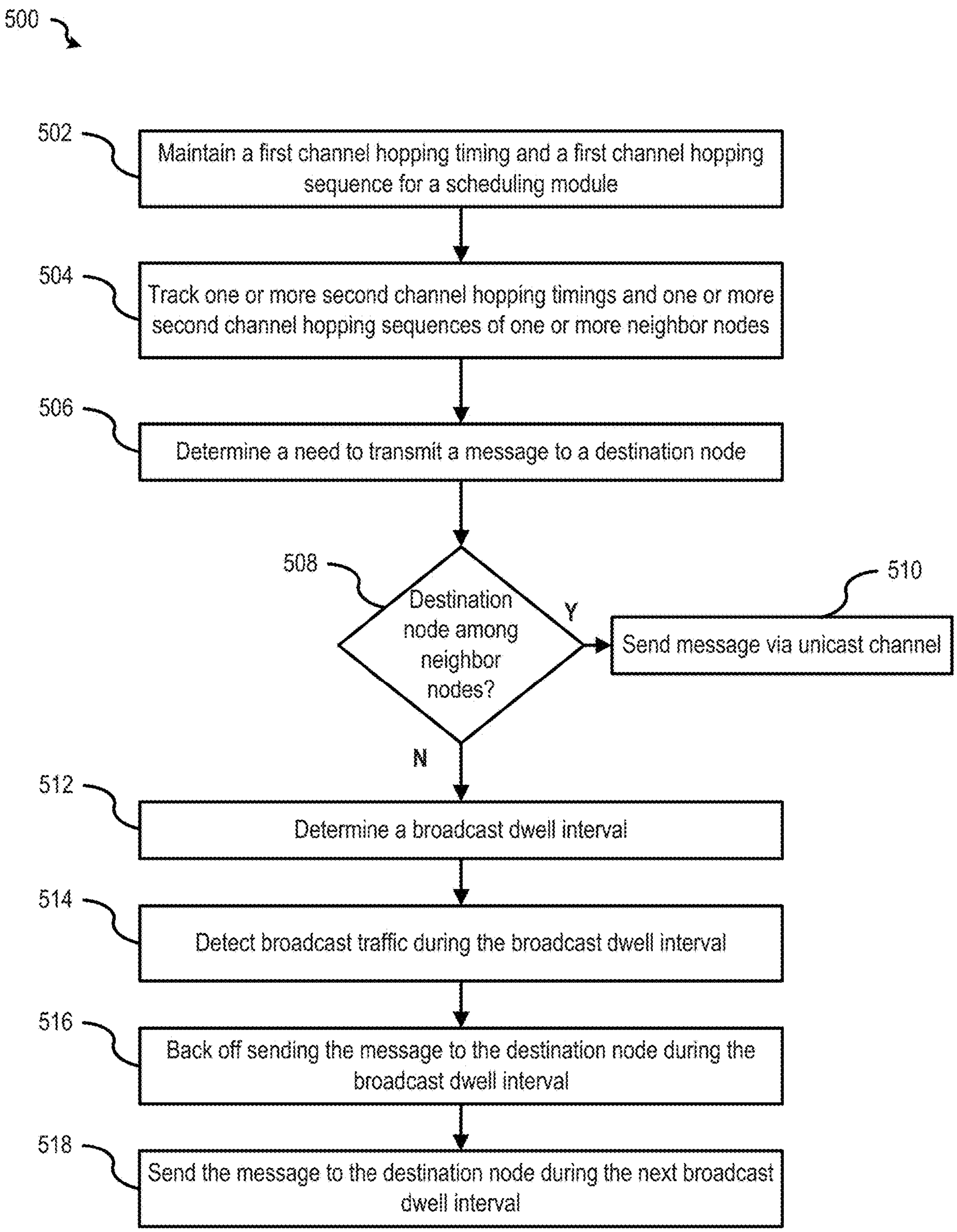
FIG. 5 illustrates another exemplary method of overloading broadcast dwell intervals in an unsynchronized channel hopping mesh network.

FIG. 5 illustrates an exemplary method 500 performed by the node. FIG. 5 represents an example of overloading broadcast dwell intervals in an unsynchronized channel hopping mesh network.

Blocks 502-512 of the method 500 are substantially similar to the corresponding blocks 402-412 of the method 400, respectively, which are described above with respect to FIG. 4.

But in this example, the method proceeds to block 514 and detects broadcast traffic during the broadcast dwell interval. For example, the node 202 may detect an amount of broadcast traffic during a current broadcast dwell interval, e.g., using the CCA described above. In one example, the node 202 detects the amount of broadcast traffic for the current channel 3 that corresponds to the current broadcast dwell interval 212.

In some examples, the node 202 may back off of the transmission until a later broadcast dwell interval. For instance, the node 202 can wait and detect an amount of broadcast traffic for a next broadcast dwell interval (e.g., corresponding to a next broadcast channel 7 depicted in FIG. 2). Further, the node 202 may detect an amount of broadcast traffic for a later broadcast dwell interval, e.g., that is subsequent to both of the current broadcast dwell interval and the next broadcast dwell interval (e.g., corresponding to a later broadcast channel 1 that is also depicted in FIG. 2).

But in this example, the node 202 detects the amount of broadcast traffic during the broadcast dwell interval using any of the techniques described herein. For example, the node 202 may detect the amount of network traffic, available bandwidth, a network resource, network schedule, an error message, an incoming notification, another message, etc. that corresponds to, is related to, is scheduled during, or is otherwise indicative of the amount of broadcast traffic during the broadcast dwell interval.

The method proceeds from block 514 to block 516, where the communication module backs off sending the message to the destination node during the broadcast dwell interval. For example, the node 202 may back off sending the unicast message during a current broadcast dwell interval. Instead, the node 202 may back off sending the unicast message until a later broadcast dwell interval. For instance, the node 202 can wait until the next broadcast dwell interval. In some examples, the node 202 may back off sending the unicast message until a later broadcast dwell interval.

Further, in some examples, the node 202 may back off sending the unicast message in response to detecting the broadcast traffic at block 514. In other examples, the node 202 may back off of the sending of the unicast message to the destination node during the next broadcast dwell interval. For instance, the node 202 may back off of sending the unicast message, determine the next broadcast dwell interval, and determine a need to send a broadcast message before the next broadcast dwell interval.

In this example, the node 202 may also determine that the broadcast message has a higher priority than the unicast message. And in response to this determination, the node 202 may transmit the broadcast message.

The method proceeds from block 516 to block 518, where the node 202 sends the message to the destination node during the next broadcast dwell interval. Once the back off period has ended, then the method proceeds to block 518 and sends the message to the destination node during the broadcast dwell interval. For example, the node 202 can send the message (e.g., a unicast message) via the broadcast channel associated with the broadcast dwell interval (e.g., the next broadcast dwell interval).

In one example, the node 202 sends the unicast message to the destination node 208, which is not among the tracked neighbor nodes, during the broadcast dwell interval.

The foregoing is provided for purposes of illustrating, describing, and explaining aspects of the present invention and is not intended to be exhaustive or to limit the invention to the precise forms disclosed. Further modifications and adaptation of these embodiments will be apparent to those skilled in the art and may be made without departing from the scope and spirit of the invention. Different arrangements of the components described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent.

What is claimed is:

1. A node, comprising:

a processor;

a wireless transceiver communicatively coupled to the processor and configured to receive communications based on a channel hopping timing interval and a channel hopping sequence; and a memory communicatively coupled to the processor and comprising instructions that are executable by the processor to cause the processor to:

store a broadcast channel hopping timing interval and a broadcast channel hopping sequence;

store a channel hopping timing and a channel hopping sequence for each of a plurality of tracked neighbor nodes;

determine whether a destination node for a unicast message corresponds to any of the plurality of tracked neighbor nodes;

based on a determination that the destination node does not correspond to any of the plurality of tracked neighbor nodes, determine (i) a next broadcast dwell interval based on the broadcast channel hopping timing interval and (ii) a next broadcast channel based on the broadcast channel hopping sequence;

based on the determination that the destination node does not correspond to any of the plurality of tracked neighbor nodes, determine to transmit the unicast message to the destination node during the next broadcast dwell interval;

at a start of the next broadcast dwell interval, listen for broadcast traffic; and back off sending of the unicast message to the destination node when broadcast traffic is detected during the next broadcast dwell interval.

2. The node of claim 1, wherein the memory further comprises instructions that are executable by the processor to cause the processor to:

transmit the unicast message to the destination node during the next broadcast dwell interval via the next broadcast channel when broadcast traffic is not detected.

3. The node of claim 1, wherein the memory further comprises instructions that are executable by the processor to cause the processor to:

in response to detecting the broadcast traffic, delay the sending of the unicast message until later in the next broadcast dwell interval.

4. The node of claim 1, wherein the memory further comprises instructions that are executable by the processor to cause the processor to:

in response to detecting the broadcast traffic, back off the sending of the unicast message until after the next broadcast dwell interval.

5. The node of claim 1, wherein the memory further comprises instructions that are executable by the processor to cause the processor to:

receive a NACK message from the destination node for the unicast message; and in response to receiving the NACK message, re-send the unicast message.

6. The node of claim 1, wherein the memory further comprises instructions that are executable by the processor to cause the processor to:

determine a failure to receive an ACK message from the destination node for the unicast message; and in response to determining the failure to receive the ACK message, re-send the unicast message.

7. The node of claim 1, wherein the memory further comprises instructions that are executable by the processor to cause the processor to:

receive a NACK message from the destination node; and in response to receiving the NACK message, re-send the unicast message during a later broadcast dwell interval.

8. The node of claim 1, wherein the memory further comprises instructions that are executable by the processor to cause the processor to:

determine a failure to receive an ACK message from the destination node; and in response to determining the failure to receive the ACK message, re-send the unicast message during a later broadcast dwell interval.

9. The node of claim 1, wherein the memory further comprises instructions that are executable by the processor to cause the processor to:

based on a determination that the destination node corresponds to one of the plurality of tracked neighbor nodes, determine a unicast dwell interval based on a channel hopping timing and a channel hopping sequence for a tracked neighbor node from among the plurality of tracked neighbor nodes; and transmit the unicast message to the destination node during the unicast dwell interval.

10. The node of claim 1, wherein the memory further comprises instructions that are executable by the processor to cause the processor to:

based on the determination that the destination node does not correspond to a neighbor node of the plurality of tracked neighbor nodes, request the channel hopping timing and the channel hopping sequence for the destination node;

receive the channel hopping timing and the channel hopping sequence for the destination node; and update a list of the plurality of tracked neighbor nodes by adding the channel hopping timing and the channel hopping sequence for the destination node, wherein the list of the plurality of tracked neighbor nodes comprises the channel hopping timing and the channel hopping sequence for each of the plurality of tracked neighbor nodes.

11. A method for transmitting unicast messages in an unsynchronized channel hopping wireless network, the method comprising:

storing, by a node, a first channel hopping timing interval and a first channel hopping sequence for the node, wherein the node comprises a wireless transceiver and a processor, and wherein the wireless transceiver of the node is configured to receive communications based on the first channel hopping timing interval and the first channel hopping sequence;

storing, by the node, a broadcast channel hopping timing interval and a broadcast channel hopping sequence;

storing, by the node, a plurality of channel hopping timings and channel hopping sequences for each of a plurality of tracked neighbor nodes;

determining, by the node, whether a destination node for a unicast message that is pending at the node corresponds to any of the plurality of tracked neighbor nodes;

based on a determination that the destination node for the unicast message does not correspond to any of the tracked neighbor nodes, determining, by the node, (i) a next broadcast dwell interval based on the broadcast channel hopping timing interval and (ii) a next broadcast channel based on the broadcast channel hopping sequence;

based on the determination that the destination node for the unicast message does not correspond to any of the tracked neighbor nodes, determining, by the node, to send the unicast message to the destination node during the next broad cast dwell interval;

at a start of the next broadcast dwell interval, listening, by the node, for broadcast traffic; and back off sending, by the node, the unicast message to the destination node when the node detects broadcast traffic during the next broadcast dwell interval.

12. The method of claim 11, further comprising:

sending, by the node, the unicast message to the destination node during the next broadcast dwell interval via the next broadcast channel when the node fails to detect broadcast traffic during the next broadcast dwell interval.

13. The method of claim 11, further comprising:

in response to detecting the broadcast traffic, delaying, by the node, the sending of the unicast message until after the next broadcast dwell interval.

14. The method of claim 11, further comprising:

receiving, by the node, a NACK message from the destination node; and in response to receiving the NACK message, re-sending, by the node, the unicast message.

15. The method of claim 11, further comprising:

determining, by the node, a failure to receive an ACK message from the destination node; and in response to determining the failure to receive the ACK message, re-sending, by the node, the unicast message.

16. The method of claim 11, wherein the destination node is a first destination node, and further comprising:

sending, by the node, a broadcast message to the first destination node and a second destination node during a later broadcast dwell interval.

17. The method of claim 11, further comprising:

sending, by the node, a second unicast message to a first tracked neighbor node of the tracked neighbor nodes by sending the second unicast message during the next channel hopping timing interval for the first tracked neighbor node on a channel defined by the channel hopping sequence for the first tracked neighbor node.

18. The method of claim 11, further comprising:

based on a determination that the destination node does not correspond to a neighbor node of the plurality of tracked neighbor nodes, requesting, by the node, the channel hopping timing and the channel hopping sequence for the destination node;

receiving, by the node, the channel hopping timing and the channel hopping sequence for the destination node; and updating, by the node, a list of the plurality of tracked neighbor nodes by adding the channel hopping timing and the channel hopping sequence for the destination node, wherein the list of the plurality of tracked neighbor nodes comprises the channel hopping timing and the channel hopping sequence for each of the plurality of tracked neighbor nodes.

19. A system, comprising:

a first node, comprising:

a first processor;

a first wireless transceiver communicatively coupled to the first processor and configured to receive communications based on a channel hopping timing interval and a channel hopping sequence; and a first memory communicatively coupled to the first processor and comprising instructions that are executable by the first processor to cause the first processor to:

store a first broadcast channel hopping timing interval and a first broadcast channel hopping sequence;

store a plurality channel hopping timings and channel hopping sequences for each of a plurality of tracked neighbor nodes;

determine whether a second node for a unicast message is among the plurality of tracked neighbor nodes;

based on a determination that the second node is not among the plurality of tracked neighbor nodes, determine (i) a broadcast dwell interval based on the first broadcast channel hopping timing interval and (ii) a next broadcast channel based on the first broadcast channel hopping sequence; and transmit the unicast message to the second node during the broadcast dwell interval; and the second node, comprising:

a second processor;

a second wireless transceiver communicatively coupled to the second processor and configured to receive communications based on a second broadcast channel hopping timing interval and a second broadcast channel hopping sequence; and a second memory communicatively coupled to the second processor and comprising instructions that are executable by the second processor to cause the second processor to:

store the second broadcast channel hopping timing interval and the second broadcast channel hopping sequence;

determine (i) the broadcast dwell interval based on the second broadcast channel hopping timing interval and (ii) the next broadcast channel based on the second broadcast channel hopping sequence;

detect the unicast message during the broadcast dwell interval; and in response to detecting the unicast message during the broadcast dwell interval, back off sending a broadcast message during the broadcast dwell interval.

20. The system of claim 19, wherein the second memory further comprises instructions that are executable by the second processor to cause the second processor to:

receive the unicast message during the next broadcast dwell interval; and delay the sending of the broadcast message until a later broadcast dwell interval.

21. The system of claim 19, further comprising:

a third node, comprising:

a third processor;

a third wireless transceiver communicatively coupled to the third processor and configured to receive communications based on a third broadcast channel hopping timing interval and a third broadcast channel hopping sequence; and a third memory communicatively coupled to the third processor and comprising instructions that are executable by the third processor to cause the third processor to:

detect broadcast traffic during the next broadcast dwell interval; and back off sending of a second unicast message to the first node or second node during the next broadcast dwell interval.

22. The system of claim 19, further comprising:

a third node, comprising:

a third processor;

a third wireless transceiver communicatively coupled to the third processor and configured to receive communications based on a third broadcast channel hopping timing interval and a third broadcast channel hopping sequence; and a third memory communicatively coupled to the third processor and comprising instructions that are executable by the third processor to cause the third processor to:

detect broadcast traffic during the next broadcast dwell interval; and send a broadcast message to the plurality of tracked neighbor nodes during a later broadcast dwell interval.

* * * * *